June 4, 1940.　　　C. B. MOORE　　　2,203,057
PEN RELEASE MECHANISM
Filed March 8, 1938
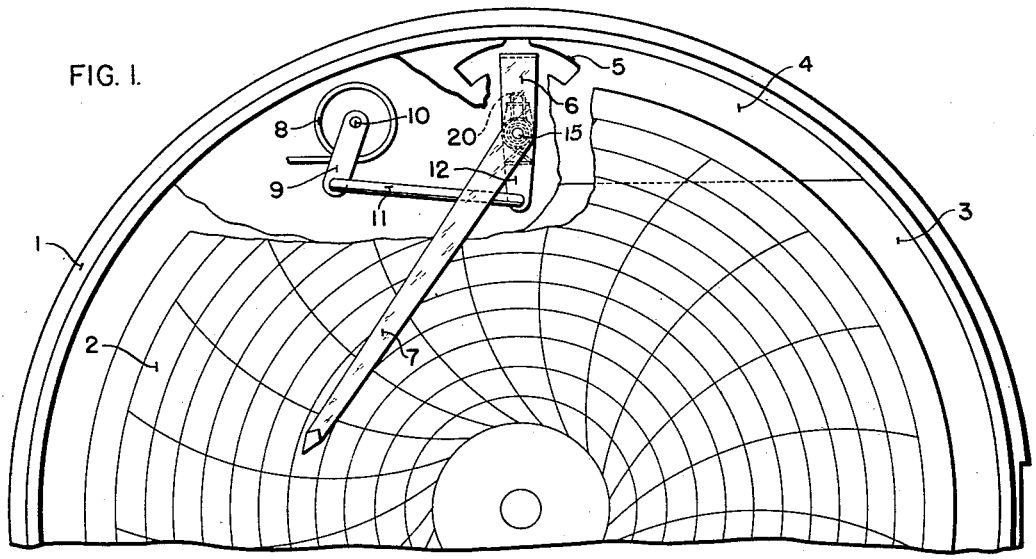
FIG. 1.
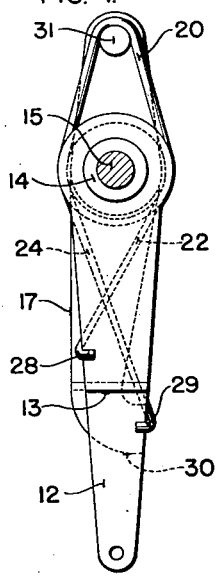
FIG. 4.
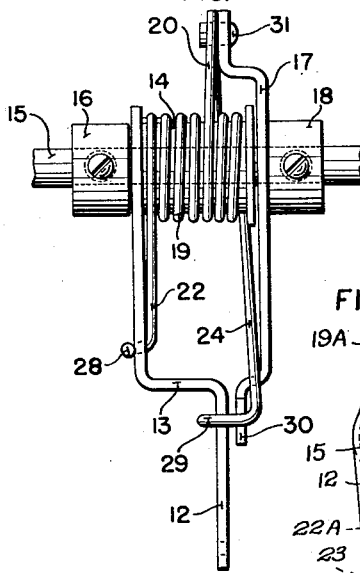
FIG. 5.
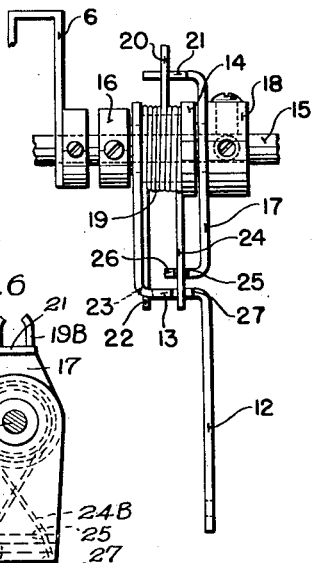
FIG. 2.
FIG. 6.
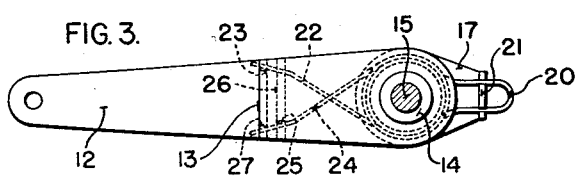
FIG. 3.
INVENTOR.
COLEMAN B. MOORE
BY George M Macclough
ATTORNEY Patented June 4, 1940

2,203,057

UNITED STATES PATENT OFFICE 2,203,057

PEN RELEASE MECHANISM

Coleman B. Moore, Carroll Park, Pa., assignor to The Brown Instrument Company, Philadelphia, Pa., a corporation of Pennsylvania Application March 8, 1938, Serial No. 194,583

12 Claims. (Cl. 74—470)

The present invention relates to recording and/or controlling instruments of a type in which an element responsive to a variable condition is adapted to move a second element and in which a resilient connection between the elements is desirable to insure normal actuation of the second element by the first, but permitting relative movement of the elements under abnormal conditions.

It is a specific object of my invention to provide such a connection which is simple in operation and easy to manufacture. To this end, I provide a novel spring connection between the two elements that will normally cause the two to move together, but will, upon abnormal conditions, permit a relative movement therebetween.

In one specific embodiment of the invention, a Bourdon tube, helix, or other actuating device is adapted to actuate one element, and the latter is adapted through my novel connection to move a pen across a rotating chart in accordance with variations in a condition being measured. In some cases, as for example in the measurement of pressure, there may be a sudden surge which with a rigid connection between the deflecting element and pen would move the pen off the edge of the chart and strike it against the side of the casing in which the meter is housed, thus damaging the pen or distorting the connection between the latter and the helix. Or, it may be that for some reason the pen has become hung up on the chart so that the measuring element will be damaged upon a variation in the condition being measured. In either case, it is desirable to have a connection between the pen and the measuring element that will permit a relative movement between the two.

The invention is also adaptable for use in control instrumentalities comprising a measuring element having a given range of movement and arranged to actuate a control element having a smaller range of movement.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

In the drawing:

Fig. 1 is a view of an instrument casing showing the arrangement of the pen, measuring element and chart therein;

Fig. 2 is a side view on an enlarged scale of my release mechanism;

Fig. 3 is a view looking from the left of Fig. 2 with the yoke omitted;

Figs. 4 and 5 are respectively front and side views of a modified form of mechanism and, Fig. 6 is a view of a modification.

In the drawing, the numeral 1 indicates a case, to house the mechanism of a measuring instrument, of any desired type. This case is usually closed by a door (not shown) and has therein a suitable motor to rotate a chart 2 at any desired speed. Back of the chart, to form a platen therefor and to jointly cover the mechanism in the case, are two segment plates 3 and 4, the upper one of which is provided with an arcuate opening 5 through which a yoke 6 supporting a pen arm 7 projects. The ends of this opening 5 act as stops to limit the movement of the pen arm 7 and are so arranged that the pen can travel freely from one end to the other of the scale markings on the chart, but will be prevented from going beyond said ends.

Mounted in the casing 1, in any suitable manner, is a measuring element 8 that may be responsive to temperature, pressure or other condition, and, in responding to variations of said condition, proportionally moves an arm 9 around a shaft 10 to thereby shift a link 11 pivotally attached thereto. The other end of link 11 is pivotally attached to the lower end of a lever 12 which is offset as at 13 between its ends, and has its upper end attached to a bushing 14 that is freely rotatable on a shaft 15 mounted for rotation in a suitable manner in the casing. The lever 12 and bushing 14 are prevented from moving axially along shaft 15 in one direction by a collar 16, and in the other direction by an arm 17 which is attached to the shaft along with a collar 18. As is shown, the yoke 6 which supports the pen arm 7 is also attached to the shaft 15 for rotation therewith, and is so placed that its front leg will project through opening 5 in sector plate 4.

From the above description, it will be seen that the lever 12 moves with the measuring element 8, and that movements of the arm 17 will impart similar movements to shaft 15 and the pen arm 7. A resilient connection is provided between the lever 12 and arm 17 so that they will normally move together, but, in the event of an abnormal condition, may move relative to each other. This connection consists of a spring 19 having a loop 20 that extends over a bent-over portion 21 on arm 17. The opposite ends of the spring are then wound around the bushing, and one end 22 is retained in a notch 23 on the offset portion 13 of lever 12, while the other end 24 is located in notch 25 in a bent-over end 26 of arm 17 and a notch 27 in the off-set portion 13. The notch 25 is of V-shape so that the end 24 will be definitely located therein, while the notch 27 is more of a U-shape to permit a slight amount of lateral play of the spring end. It should be noted that the spring has twice as many coils between loop 20 and end 22 as it has between loop 20 and end 24.

In the operation, assume that the pen arm 7 has been moved to the limit of its travel in a clockwise direction in Figures 1 and 3 thus stopping shaft 15 and arm 17. Continued movement of lever 12 in that direction will cause a relative movement between the lever and arm 17 against that portion of spring 19 between its end 22 and the loop 20. The resistance of the spring will be proportional to the number of coils between its end 22 and the loop, the end 24 having no effect because it is retained in contact with arm 17. When the pen arm reaches the limit of its travel in a counter-clockwise direction in Figures 1 and 3, the arm 17 will also be stopped. Continued movement of lever 12 in a counterclockwise direction will then be opposed by extension 24 of the spring with a force proportional to the number of turns between that extension and loop 20. This movement will also be assisted by that portion of the spring between loop 20 and end 22. The force opposing the motion of lever 12 in this case will be twice that of the force assisting its motion because of the two to one ratio of the coils of the spring between loop 20 and the ends thereof. Thus, the force of the spring, tending to keep lever 12 in alignment with arm 17, is equal in both directions, since in one case it is the force of extension 22 of the spring, and in the other case it is the force of extension 24 opposed by the force of extension 22.

The modification disclosed in Figures 4 and 5 is identical with that of Figures 1-3 with the exception of the manner in which the ends of the spring 19 engage arm 17 and lever 12. Instead of forming a notch similar to notch 23 in lever 12 to receive extension 22 of the spring, this end has a hook 28 formed on its end to engage a side of the lever. The extension 24 of the spring in this modification has a bent end 29 that overlies an off-set portion 30 of arm 17 and the lower end of lever 12. In this manner, the extension is in engagement with both the arm and lever as it was in the previous modification. Also in this modification, the loop 20 of the spring is shown as being received by a pin 31 extending from the upper end of arm 17.

In both modifications of this invention, it should be noted that there are no particular requirements for precision manufacture of the connection, since the two levers will assume their normal position, regardless of exact bending or punching of the parts. This is true because there is provided in effect a three point contact between the spring and the levers; therefore, a position of equilibrium must be reached.

In each of the modifications, the spring 19 is in effect two separate springs and could be so made if desired as shown in Figure 6 at 19A and 19B with their respective ends 24B and 22A received in notches 25 and 27 and in notch 23. This is true, since the loop 20 serves to divide the spring 19 into two portions, exerting an unequal force on the arm and element respectively. This spring is generally made in one piece solely for convenience in manufacture rather than because of any lack of effectiveness in the use of two separate springs.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In an instrument of the class described, an element movable in accordance with variations in a condition, a second element, resilient means connecting said elements for movement, one with the other, comprising a resilient part acting on both elements, and a second resilient part acting on one element in opposition to the first resilient part.

2. In an instrument of the class described, an element movable in accordance with variations in a condition being measured, an indicating member, an arm movable with said member, means to normally cause said element and arm to move together but to permit relative movement therebetween, said means comprising a first resilient member urging said element in one direction, and a second resilient member urging said element in an opposite direction into engagement with said first resilient member.

3. In a measuring instrument, an element movable in accordance with variations in a condition being measured, an indicating member, an arm movable with said member, means to normally cause said element and arm to move together, but to permit relative movement therebetween, said means comprising a spring having a loop therein engaging said arm, and the ends thereof engaging said element and said arm and element respectively.

4. In a measuring instrument, an overload release comprising in combination a shaft, an element rotatable about said shaft in response to variations in a measurable condition, an arm attached to said shaft, means to move said element and arm together, but adapted, under certain conditions, to permit relative movement therebetween, said means comprising an anchored member adapted to exert a force against said arm and element in one direction, and adapted to exert half as large a force against said element in the opposite direction.

5. In a measuring instrument, the combination with a shaft, of an element having a journal attached thereto rotatable on said shaft, an arm attached to and extending above and below said shaft, a spring coiled around said journal and having a loop therein, twice as many coils being on one side of said loop as on the other, the end of said spring extending from the larger number of coils engaging said element, the end of said spring extending from the smaller number of coils engaging said element and one end of said arm, and the loop surrounding the other end of said arm.

6. In a measuring instrument, a shaft, an element journaled on said shaft and having an offset portion, an arm attached to said shaft and formed with a bent-over end overlying the off-set portion of said element, aligned notches in said bent-over end and said off-set portion and a third notch in the opposite side of the said off-set portion, a resilient member having an end in said aligned notches and urging said element in one direction, a second resilient member having an end in said third notch and urging said element toward said first member in opposition to said first member.

7. In a measuring instrument, a shaft, an element journaled on said shaft, an arm attached to said shaft, a spring coiled around said shaft and having a loop in it engaging part of said arm, one end of said spring urging said element in one direction, the second end of said spring urging said element in the other direction with a force larger than that exerted by the first end of the spring, movement of said second end of the spring in said other direction being limited by engagement with said arm, whereby, as said element is moved in said other direction, it will be opposed by a force exerted by the first end of the spring, and, as said element is moved in said first direction, it will be opposed by a force exerted by said second end of the spring and assisted by the force exerted by the first end of said spring.

8. In a measuring instrument, an overload release comprising in combination, a shaft, an arm attached thereto, an element journaled thereon, means urging said element in one direction relative to said arm, and urging said element in an opposite direction relative to said arm with a larger force, the larger force being limited in movement in said opposite direction by said arm, whereby movement of said element in the opposite direction is opposed by the smaller force, and movement in the first direction is opposed by the larger force and assisted by the smaller force.

9. In a measuring instrument, an element movable in response to variations in a condition, an exhibiting member movable within limits, an arm connected for movement therewith, means connecting said element and arm for normal movement together but permitting relative movement therebetween as the exhibiting member reaches the limits of its movement, said means comprising a coiled spring with its ends in contact with said element, and one end only also in engagement with said arm.

10. In an instrument of the character described, an element movable in accordance with a variable condition, a second element to be moved by the first-mentioned element, a resilient member engaging one element with a given force, a second resilient member engaging the second element with a force less than but opposing the first-mentioned force and urging the second element into engagement with the first resilient member, thereby aligning both of said elements with said first resilient member.

11. In an instrument of the class described, a source of power, an element adapted to be moved thereby, a second element to be normally moved by said first element, a compound spring resiliently connecting said elements for movement together, one part of said spring urging one element in a first direction with a given force to a position limited by the second element, and another part urging said one element in an opposite direction with a smaller force, into engagement with said first part, said resilient connection permitting relative movement when one of said elements is restrained from movement.

12. In a measuring instrument, an exhibiting member movable between limits, an arm movable therewith, a condition responsive means, an element moved thereby, a means normally connecting said arm and element for movement together, whereby said condition responsive means will move said member, said connecting means comprising a spring having a plurality of coils and formed with a loop between two of said coils, one end of said spring engaging said element only and the other end of said spring engaging said arm and element.

COLEMAN B. MOORE.